Oct. 4, 1960 T. W. WINSTEAD 2,954,901
COMPOSITE PACKAGE
Filed Oct. 29, 1956 5 Sheets-Sheet 1

INVENTOR
THOMAS W. WINSTEAD

BY *Semmes & Semmes*

ATTORNEYS

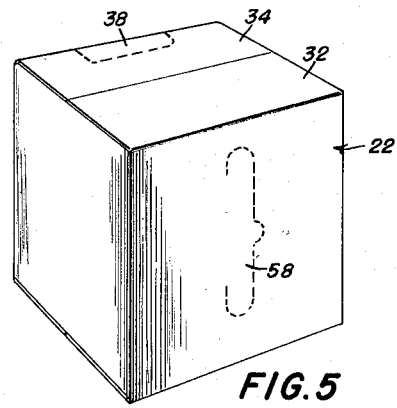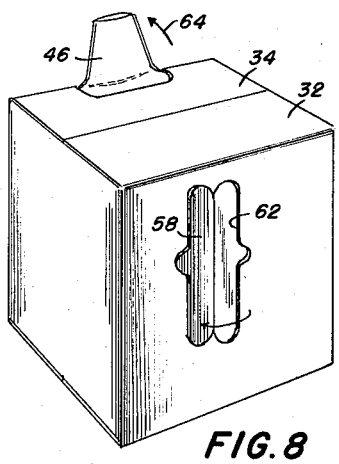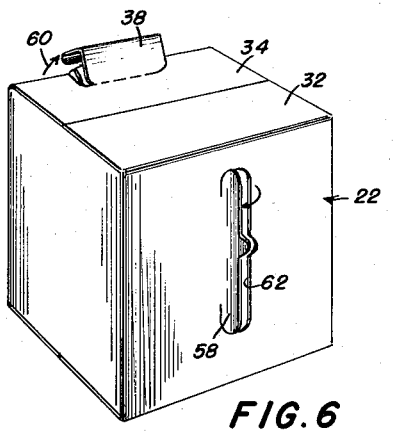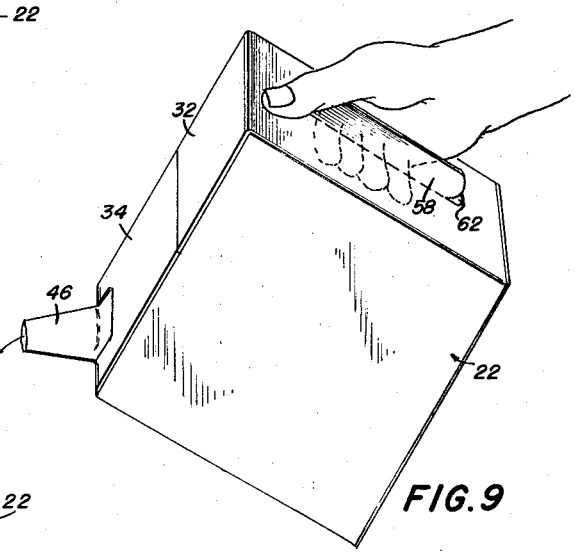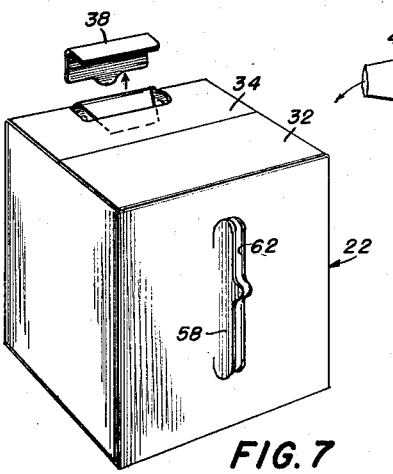

Oct. 4, 1960 T. W. WINSTEAD 2,954,901
COMPOSITE PACKAGE
Filed Oct. 29, 1956 5 Sheets-Sheet 3

INVENTOR
THOMAS W. WINSTEAD

BY *Semmes & Semmes*

ATTORNEYS

Oct. 4, 1960

T. W. WINSTEAD 2,954,901

COMPOSITE PACKAGE

Filed Oct. 29, 1956

INVENTOR
THOMAS W. WINSTEAD

BY Semmes & Semmes

ATTORNEYS

Oct. 4, 1960 T. W. WINSTEAD 2,954,901
COMPOSITE PACKAGE
Filed Oct. 29, 1956 5 Sheets-Sheet 5

INVENTOR
THOMAS W. WINSTEAD
BY Semmes & Semmes
ATTORNEYS

United States Patent Office 2,954,901
Patented Oct. 4, 1960

2,954,901

COMPOSITE PACKAGE

Thomas W. Winstead, Baltimore, Md., assignor to Hedwin Corporation, Baltimore, Md., a corporation of Maryland Filed Oct. 29, 1956, Ser. No. 618,927

5 Claims. (Cl. 222—183)

This invention relates broadly to packages and more specifically to a composite package including an inner liner or container and an outer carton.

An object of the present invention is to provide a package for safe shipment of liquids, powders and semi-solids, and the like.

Another object of the present invention is to provide such a package which is light weight, low in cost of manufacture, easy to use and tough.

A further object of the present invention is to provide a composite package having space saving features and incorporating safe closure means.

A still further object of the present invention is to provide a composite package including an inner liner or container which is "formed" to shape and which insert is shaped to fit the interior contour of the outer carton without folds or creases and including ample radii at all corners thereof to stiffen them against flexing.

Another object of the present invention is to provide in such a composite package a liner formed of a semi-rigid, thermoplastic material and having a pouring neck or spout formed in a side edge thereof and adapted for folding within the outer carton for shipping and/or re-sealing.

An additional object of the present invention is to provide a composite package including an outer carton having stiffness sufficient for protection of an inner container formed of a semi-rigid, thermoplastic material.

Another object of the present invention is to provide in such a package an outer carton which is susceptible of collapsing for easy shipping and storage.

A further object of this invention is to provide in such a composite package an outer carton or container having means defining tear-out portions whereby a pouring spout of an inner container is rendered accessible, and further provision is made for knock-out or bendable portions in the outer carton to provide hand grips for lifting and carrying the container and/or pouring material from the inner container held therein.

A further object of the present invention is to provide a composite package or container composed of a semi-rigid polyethylene insert and an outer corrugated cardboard box to provide a tough, strong, light weight and economical package for single-trip shipments.

Another object of the present invention is to provide a composite package wherein an outer carton can be erected easily on automatic equipment, and, after inserting an inner container, the outer carton and package can be sealed on a continuous basis.

A still further object of the present invention is to provide a composite package which is a combination of a plastic insert and an outer carton made of paper or other materials in which the outer carton can serve as a shipping container and is collapsible as is the insert or inner container and in which the outer carton also provides easily printable and ample surface area for decoration and other copy.

Another object of the present invention is to provide in a composite package a construction whereby an outer carton has a number of possible locations of hand-holds, and wherein a cut-out is provided in the under flap of the outer carton and the outer flap thereof to provide access to a pouring spout in a plastic inner container, and wherein after the insert is filled and sealed, the spout can be readily folded by the flap of the outer carton which must be brought in to close the carton itself.

Further and additional objects and advantages of the present invention will be more readily apparent from the following description of embodiments of the invention when taken together with the accompanying drawings, in which:

Figures 5, 6, 7 and 8 are perspective views showing the sequence of steps in opening and preparing the composite package for use;

Figure 9 is a perspective view of the composite package in use;

Figure 15:
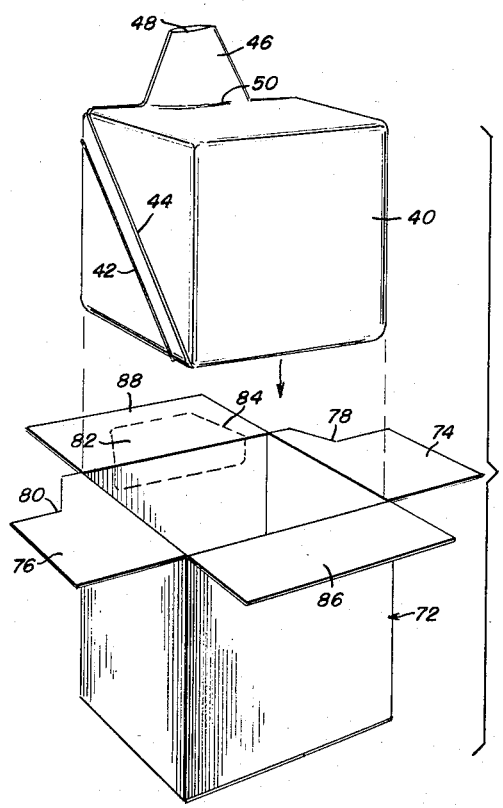
Figure 17:
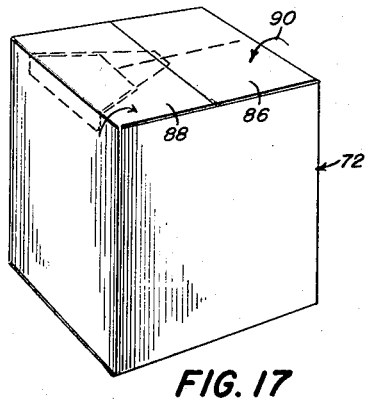
Figure 16:
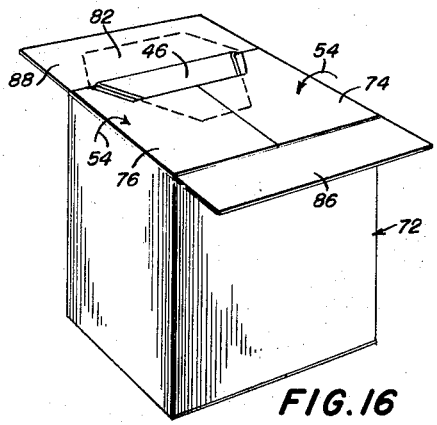
Figure 18:
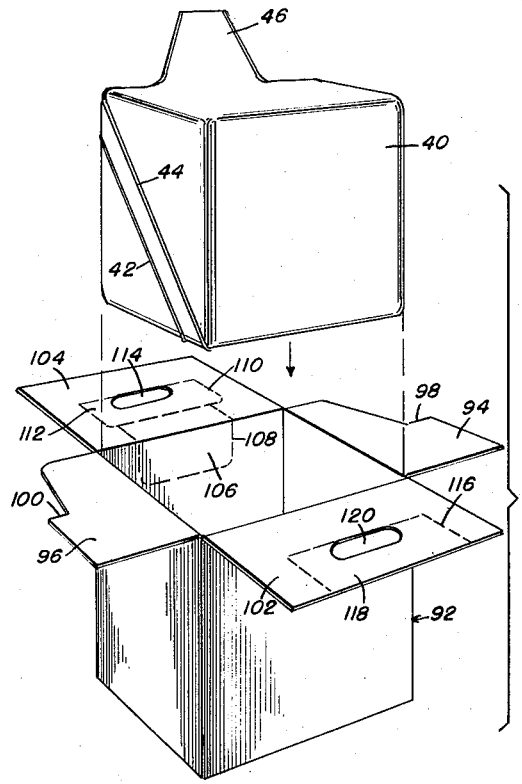
Figure 20:
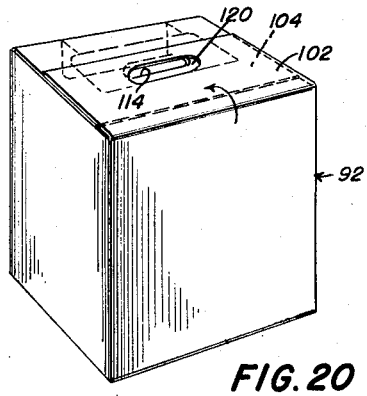
Figure 19:
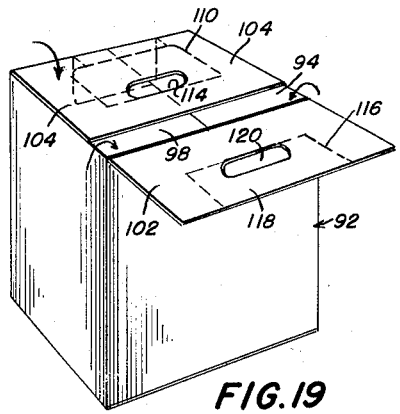
Figure 21:
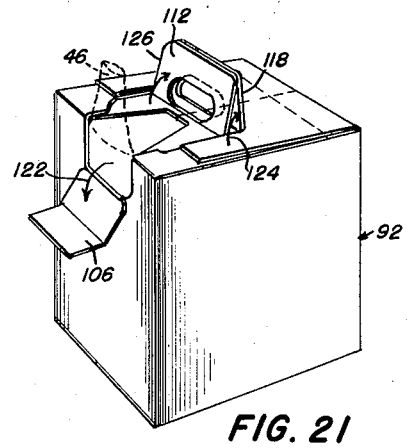

Figures 15, 16, and 17 are perspective views showing the steps of completing and assembling a further embodiment of the invention;

Figures 18, 19 and 20 are perspective views showing the steps of forming and assembling a still further embodiment of the package of the present invention; and Figure 21 is a perspective view showing the latter embodiment in open position ready for use.

In the various views of the drawings, like reference characters are applied to like parts.

The outer carton or container generally designated 22 is fabricated of stiff paper or cardboard, such as corrugated cardboard, of the desired thickness and stiffness to fulfill the requirements of the use for which the package is intended. This outer carton 22 is preferably in the shape of a cube, although manifestly other shapes can be used and the carton can be of any desired size.

Figure 4:
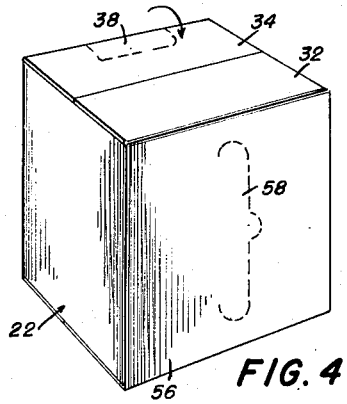
Figure 10:
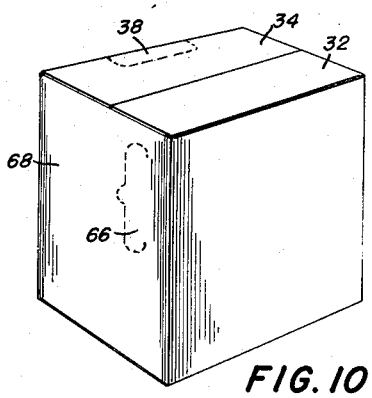
Figures 10, 11, 12 and 13 are perspective views showing the sequence of steps in opening and preparing for use a modified form of package.
Figure 13:
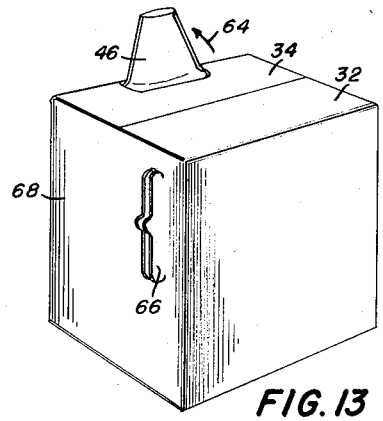
Figure 11:
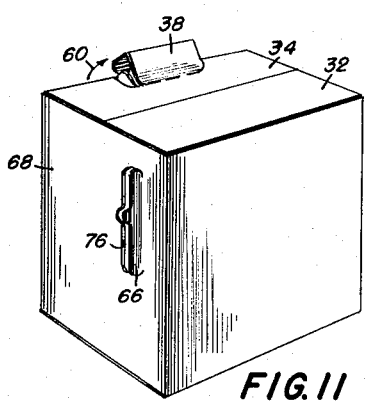
Figure 12:
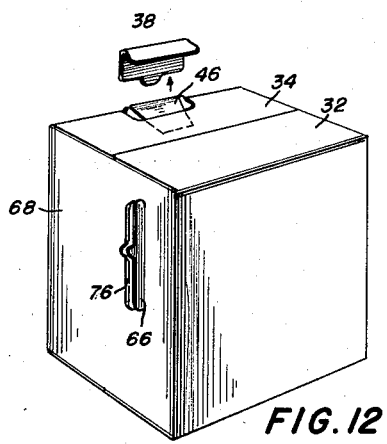

The outer carton is provided with the usual bottom flaps, not shown, which are folded over and sealed in a usual manner. The upper end of carton 22 is provided with inner flaps 24 and 26 which are preferably provided with cut-out portions 28 and 30 respectively. Outer flap 32 is not provided with any cut-out portion, and its counterpart on the opposite side namely, flap 34, is provided, in conjunction with the side wall 36 of the carton, a perforated punch-out or knock-out portion 38, which, when the carton is entirely closed as shown in Fig. 4, extends around an upper end or edge of the carton for purposes hereinafter to be described.

The inner container or insert 40 is preferably formed of a semi-rigid, thermoplastic material and is formed to shape to fit the interior of the outer carton without folding or creasing. This insert is more fully described and set forth in my co-pending application Serial No. 618,913, filed October 29, 1956, and will not be described in detail herein, except insofar as necessary to an understanding of the present invention.

This inner container 40 is collapsible for nesting with a plurality of other identical containers by collapsing about fold line 42 formed as an indentation in the material of the body in parallel spaced relationship to seam 44 where two symmetrical half-portions are heat-sealed together to form the container. At one edge of the insert 40 a semi-rigid filling and pouring spout or neck 46 is provided. The construction and configuration of this neck is of importance in the finished structure. It has an outlet opening 48 of a flared oval shape and tapers to a transversely narrowed throat as at 50 where it attaches to the remainder of the container. As it tapers from the opening 48 to the throat 50, the side dimensions are increased. The resultant structure provides a substantial measure of flexibility at the throat 50 which permits this spout to be folded easily against a wall of the container serving as a valve for closing and sealing purposes. It is to be noted that the spout 46 is located, in assembled relationship of the inner container and outer carton, at the location of the knock-out portion 38.

Figure 1:
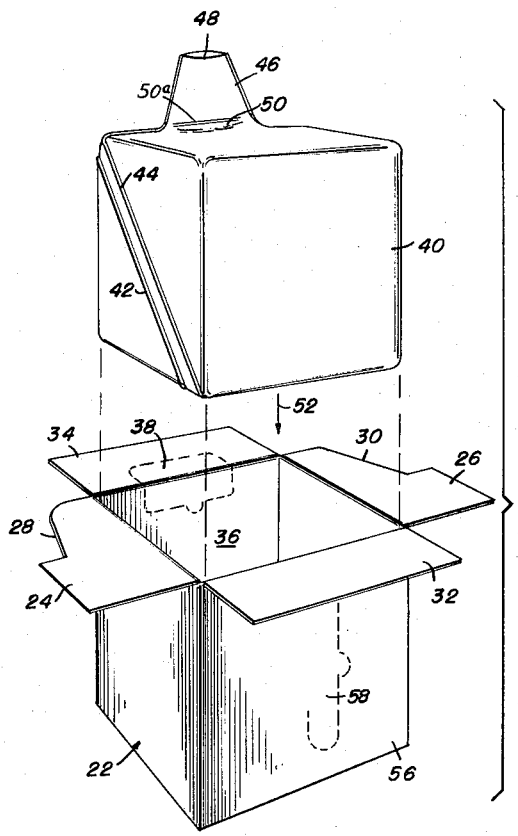
Figure 1 is an exploded perspective view showing the outer carton and inner container in disassembled relationship.

In order to more readily adapt the spout 46 for folding, a fold line 50a (Fig. 1) may be provided in the spout, as explained in my said copending application. This fold line is formed by providing a slight indentation extending across the spout adjacent the throat 50.

In assembling the package, the outer carton 22 is first erected and the bottom flaps closed and sealed. Thereafter the inner container or insert 40 is erected and placed in the interior of the outer carton as indicated by the arrow 52 in Figure 1.

Figure 3:
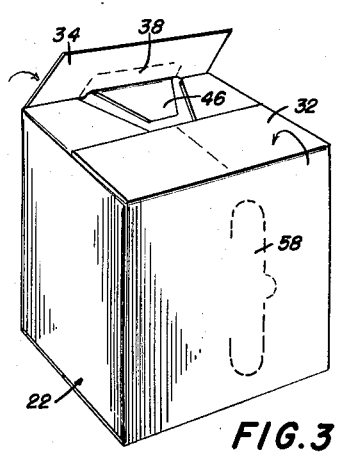
Figures 2, 3 and 4 are perspective views showing the sequence of steps in closing and sealing the package.
Figure 2:
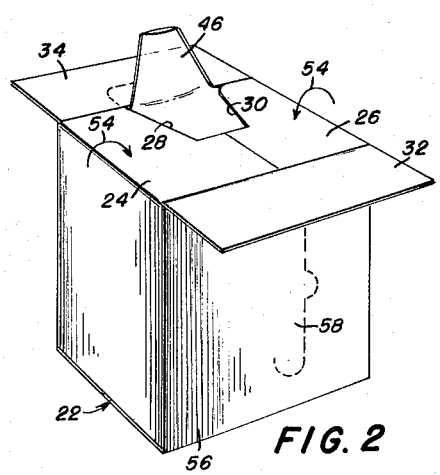

The inner container is now filled with material and the filling and pouring spout is sealed in any desired manner, such as by heat-sealing. Thereafter inner flaps 24 and 26 are folded into the position shown in Figure 2 as indicated by the arrows 54. It is noted that the cut-outs 28 and 30 leave sufficient space for the folding down of the spout 46 against the top of the body of the inner container when the flaps 32 and 34 are closed as shown in Fig. 3, and finally in the sealed position shown in Fig. 4 the package is completed by sealing down of the flaps 32 and 34. The folding down of the spout can be effected by folding the flaps.

In the embodiment above described, perforations are formed in the side 56 of the outer carton 22, which side is the one opposite the side 36 having the knock-out portion 38 therein. The perforations define a portion or area 58 which can be bent outwardly with respect to the outer carton and provide a hand-hold.

Figures 5–9 inclusive show the steps or method leading to the opening of the package shown in the preceding figures and the step of pouring material from the inner container. The sealed and closed package is shown in Fig. 5. In Fig. 6 the knock-out portion 38 has been partially freed from the outer carton and moved in the direction of arrow 60. This knock-out portion 38 is shown as being entirely removed in Fig. 7 and in these figures, the hand-hold portion 58 has likewise been moved outwardly with respect to the container or carton body and providing a hand-hold opening 62. After the knock-out portion 38 has been completely removed, as shown in Fig. 7, the filling and pouring spout 46 is pulled out of the carton in the direction of arrow 64 to the extended position shown in Fig. 8. A portion of the end of this pouring spout or the entire end can be cut off to open the inner container. In Fig. 9, the operation of this package is shown with a portion of a hand inserted through hand-hold 62 and whereby the entire package can be placed into pouring or dispensing position. Due to flexibility of the inner container, the hand can easily be inserted in the opening.

As previously stated in the objects of the invention, the pouring spout is adapted for folding within the outer carton for resealing. In this connection, attention is directed to Fig. 7 where it will be seen in dotted lines that the length of the spout in the direction in which it is folded is such that the discharge end thereof normally underlies the adjacent boundary of the opening formed by removal of the knock-out portion 38 of the outer carton. Thus, after partially discharging the contents of the inner container with the spout projected as shown in Fig. 8, the spout can be re-folded at its throat and its discharge end tucked under the bounding edge of the opening in the outer carton to maintain the spout in folded and sealed condition.

Figure 14:
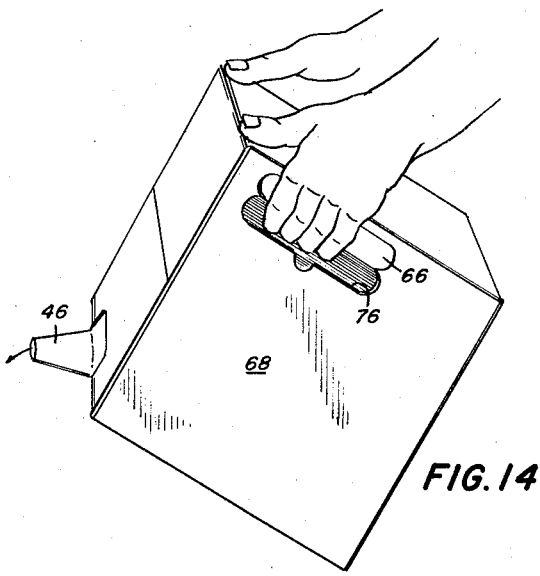
Figure 14 is a perspective view showing the mode of use of this embodiment of this invention.

The embodiment of the package shown in Figures 10–14 inclusive is substantially the same as that of the preceding figures, but the hand-holds are placed in different positions and the package is adapted for a larger size and accordingly a heavier package, although this is not necessary. Instead of hand-holds such as 62 being provided in the side opposite that portion having the knock-out area 38 and spout, in this embodiment perforated portions 66 are provided on the two sides adjacent the side having the knock-out portion 38 and disposed toward the rear of these sides 68. While it cannot be seen from the drawings, it is to be understood that these perforations 66 are provided on the parallel opposite sides. In operation this device is quite similar to the previous embodiment in preparing for use, including opening outwardly of the portions formed by the perforations 66 to provide hand-holds with openings 70 on both sides of the outer carton. As shown in Fig. 14, in order to dispense the contents of the container, the user places both hands in openings 70 on the two sides of the carton, and due to their placement in proximity to the rear of the sides 68, the thumbs of a user can be placed in proximity to the top edge to aid in steadying and pouring of the contents through the spout 46.

Referring now to Figs. 15 to 17 inclusive, there is disclosed a construction of the composite package adapted for small size use. The insert or inner container 40 is the same in this embodiment although of a smaller size. The outer carton 72 is provided with inner flaps 74 and 76 at the top end thereof having cut-out portions 78 and 80 in a manner similar to those in the other embodiment shown at 28 and 30. The configuration of these cut-out portions 78 and 80 is slightly different than those of the other embodiments. Manifestly any desired extent or configuration of the cut-out portions can be utilized, and if desired they can be omitted altogether.

In this embodiment a knock-out portion 82 is defined by perforations 84 in such a manner that the portion 82 extends over an edge of the carton. The assembling of this embodiment of the package is similar to the others in that the flaps 74 are folded inwardly as indicated by arrows 54 in Fig. 16, and subsequently the outer flaps 86 and 88 are folded inwardly as indicated by the arrows 90 and sealed.

In use the knock-out portion 82 is removed and thereafter the spout 46 can be released into dispensing position and the seal thereof removed. Since this construction is of a small size and lightweight, no hand holds are considered necessary and they are eliminated.

In Figs. 18 to 21 inclusive of the drawings, a further embodiment of the invention is disclosed wherein hand holds are not provided in the sides of the outer carton, but on the contrary a carrying handle is utilized. Again in this embodiment, the inner container or insert 40 is substantially identical with the previous ones. The outer carton 92 is provided at the top with inner flaps 94 and 96, having cut-outs 98 and 100 for the same purpose as in the preceding embodiments. Outer flaps 102, 104 are also provided at the upper end of the carton. A knock-out portion 106 is formed by means of perforations as at 108 and arranged in the same position as in the preceding embodiments. Additionally, however, outer flap 104 has perforations 110 defining a bendable handle 112 with a hand hold 114 therein. Outer flap 102 also has perforations 116 extending inwardly from the outer edge and defining a bendable portion to form a handle 118 from this outer flap having a hand hold 120. Filling and closing of this embodiment of the invention is substantially the same as the previous ones with the exception that the outer flaps 102, 104 are of such a length that when folded into the position shown in Figs. 19 and 20, the flap 102 overlaps the flap 104 a substantial distance, and the handle portions 112, 118 are in substantially overlying relationship. When preparing this form of carton for use, the knock-out portion 106 is bent outwardly in the direction of arrow 122 as shown in Fig. 21, and can be completely removed if desired. The two handle portions 112, 118 are then bent upwardly as indicated by the arrows 124, 126 into upstanding position shown in Fig. 21. The spout 46 is then freed. The user would grip the upstanding handles 112, 118 by grasping the hand holds 114, 120 and dispense the material from the inner container in a readily understandable manner.

While various embodiments of the invention have been shown in the drawing and described in the preceding specification, manifestly minor changes in details of construction will be readily apparent to those skilled in the art, and it is understood that such modifications are within the spirit and scope of the present invention as defined by, and limited solely by, the appended claims.

I claim:

1. In a composite package, an outer carton and a separable inner container, said inner container having a semi-rigid body portion, a semi-rigid neck forming a filling and pouring spout projecting from said body portion and foldable onto an adjacent wall thereof to form a valve, severable means on said outer carton defining a displaceable portion, said displaceable portion being positioned in proximity to said neck and upon displacement with respect to said outer carton providing an access opening through which said neck is projectible for placing it in operative pouring position, the length of said neck in the direction in which it is folded being such that the discharge end of said neck normally underlies the adjacent boundary of said access opening, whereby a portion of said neck when folded, is insertable beneath the adjacent portion of the outer carton directly against a wall of said body, to maintain said neck valve in closed and sealed position.

2. A composite package as claimed in claim 1, wherein said neck is relatively flat and laterally elongated in one direction and narrowed in a direction at right angles thereto, to form a throat, and a fold line in said neck adjacent said throat.

3. In a composite package, an outer carton and a separable inner container of semi-rigid material, said inner container having a body portion, the walls of which are formed to substantially the inner shape of the outer carton, a semi-rigid neck forming a filling and pouring spout projecting from said body portion and foldable onto an adjacent wall thereof to form a valve, severable means on said outer carton defining a displaceable portion, said displaceable portion being positioned in proximity to said neck and upon displacement with respect to said outer carton providing an access opening through which said neck is projectible for placing it in operative pouring position, the length of said neck in the direction in which it is folded being such that the discharge end thereof normally underlies the adjacent boundary of said access opening, whereby a portion of said neck when folded, is insertable beneath the adjacent portion of the outer container directly onto a wall of said body, to maintain said neck valve in closed and sealed position.

4. A composite package as claimed in claim 3, wherein said outer carton is of rectangular shape and said displaceable portion extends over and around an upper edge thereof.

5. In a composite package, an outer carton of rectangular shape and a separable inner container of semi-rigid material, said inner container having a body portion, the walls of which are formed to substantially the inner shape of the outer carton, an integral, semi-rigid neck formed on one edge of said inner container, providing a filling and pouring spout projecting from said body portion and foldable onto an adjacent wall thereof to form a valve, severable means on said outer carton defining a displaceable portion extending over and around an edge of said outer carton in proximity to said neck and upon displacement with respect to said outer carton, providing an access opening through which said neck is projectible for placing it in operative pouring position, the length of said neck in the direction in which it is folded being such that the discharge end thereof normally underlies the adjacent boundary of said access opening, whereby a portion of said neck when folded, is insertable beneath the adjacent portion of the outer carton directly against a wall of said body, to maintain said neck valve in closed and sealed position.

References Cited in the file of this patent

UNITED STATES PATENTS

| Number | Name | Date |
|---|---|---|
| 1,020,536 | Byrne | Mar. 19, 1912 |
| 1,253,436 | Smith | Jan. 15, 1918 |
| 2,214,944 | Vogt | Sept. 17, 1940 |
| 2,293,182 | Vogt | Aug. 18, 1942 |
| 2,382,536 | Baxter | Aug. 14, 1945 |
| 2,446,308 | Smith | Aug. 3, 1948 |
| 2,554,050 | Neubeck | May 22, 1951 |
| 2,555,526 | Zinn | June 5, 1951 |
| 2,686,000 | Berke | Aug. 10, 1954 |